(12) United States Patent
Doman (10) Patent No.: US 9,668,510 B2
(45) Date of Patent: Jun. 6, 2017

(54) COOLER WITH VACUUM PUMP

(71) Applicant: Marthinus Hendrik Doman, Boyle (CA)

(72) Inventor: Marthinus Hendrik Doman, Boyle (CA)

( * ) Notice: Subject to any disclaimer, the term of this patent is extended or adjusted under 35 U.S.C. 154(b) by 11 days.

(21) Appl. No.: 14/450,129

(22) Filed: Aug. 1, 2014

(65) Prior Publication Data
US 2015/0216221 A1 Aug. 6, 2015

Related U.S. Application Data

(60) Provisional application No. 61/965,586, filed on Feb. 4, 2014.

(51) Int. Cl.
| | |
|---|---|
| *A23L 3/00* | (2006.01) |
| *A23L 3/015* | (2006.01) |
| *A23L 3/3418* | (2006.01) |
| *A23L 3/36* | (2006.01) |
| *F25D 17/04* | (2006.01) |

(52) U.S. Cl.
CPC ........... *A23L 3/0155* (2013.01); *A23L 3/3418* (2013.01); *A23L 3/363* (2013.01); *F25D 17/042* (2013.01); *F25D 2317/043* (2013.01)

(58) Field of Classification Search
CPC ........ A23L 3/0155; A47J 41/00; B65D 81/00; B65D 81/38; B65D 81/3823; B65B 31/04
USPC .......... 141/8, 65; 220/592.11, 592.2, 592.21, 220/592.25, 592.26, 592.27
See application file for complete search history.

(56) References Cited

U.S. PATENT DOCUMENTS

| | | | | |
|---|---|---|---|---|
| 1,541,945 | A | * | 6/1925 | Hamilton .............. F25D 23/062 220/592.11 |
| 1,635,815 | A | * | 7/1927 | Briggs .................. A23L 3/3418 220/325 |
| 2,036,007 | A | * | 3/1936 | Wheatley .............. A23L 3/0155 99/472 |
| 3,823,567 | A | | 7/1974 | Corini |
| 4,016,999 | A | * | 4/1977 | Denzer ................. B65B 31/047 220/231 |

(Continued)

OTHER PUBLICATIONS

Downloaded from Wikipedia on Aug. 7, 2014: Cooler, from Wikipedia, the free encyclopedia; p. 1-3.

(Continued)

*Primary Examiner* — Timothy L Maust
(74) *Attorney, Agent, or Firm* — Anthony R. Lambert (57) ABSTRACT

A cooler with an insulated housing comprising an encircling wall, base and lid, the insulated housing defining a storage cavity and having an air channel communicating from the storage cavity to outside the insulated housing, the air channel being defined by channel walls and forming at least in part a cylinder; and a vacuum pump integral with the insulated housing, the vacuum pump comprising a piston arranged to reciprocate within the cylinder under manual control from outside of the insulated housing. A method including placing material within a storage cavity of an insulated cooler, the material having an average temperature different than an ambient temperature; closing a lid over the storage cavity; and operating a vacuum pump to reduce the air pressure within the storage cavity. A combination of the cooler and ice within the storage cavity.

12 Claims, 6 Drawing Sheets

(56) References Cited

U.S. PATENT DOCUMENTS

| | | | |
|---|---|---|---|
| 4,362,095 A * | 12/1982 | Wheatley | A47J 47/06 206/524.8 |
| 4,448,041 A * | 5/1984 | Southworth, Jr. | B60P 3/20 62/239 |
| 5,390,809 A * | 2/1995 | Lin | B65B 31/047 137/522 |
| 5,398,811 A | 3/1995 | Latella, Jr. | |
| 5,485,921 A | 1/1996 | Tolendano | |
| 5,597,086 A * | 1/1997 | King-Shui | A47J 41/02 220/23.87 |
| 5,611,376 A * | 3/1997 | Chuang | B65B 31/047 141/65 |
| 5,692,632 A * | 12/1997 | Hsieh | B65D 81/20 215/228 |
| 5,806,575 A * | 9/1998 | Tsay | B65D 81/2015 141/192 |
| 5,827,385 A * | 10/1998 | Meyer | B29C 44/56 156/146 |
| 5,865,037 A * | 2/1999 | Bostic | B65D 81/2038 220/361 |
| 5,918,478 A * | 7/1999 | Bostic | B65D 81/2038 220/592.25 |
| D414,084 S | 9/1999 | Schmidt | |
| 5,964,255 A | 10/1999 | Schmidt | |
| 6,135,277 A * | 10/2000 | Armstrong | A45C 13/02 206/314 |
| 6,148,875 A | 11/2000 | Breen | |
| 6,199,699 B1 | 3/2001 | Eastman | |
| 6,510,946 B2 | 1/2003 | Gutierrez et al. | |
| 6,644,489 B2 * | 11/2003 | Chang | B65D 81/2038 215/260 |
| 6,732,874 B2 * | 5/2004 | Zilberman | A47J 47/10 206/524.8 |
| 7,076,929 B2 | 7/2006 | Patterson et al. | |
| 7,331,163 B2 | 2/2008 | Hau et al. | |
| 8,256,242 B1 | 9/2012 | Evans | |
| 2007/0000396 A1* | 1/2007 | Kieck | A47J 47/12 99/476 |
| 2014/0034655 A1* | 2/2014 | Wooldridge | B65D 81/3818 220/592.27 |

OTHER PUBLICATIONS

Brochure from Moeller Marine Products; Ice Station Zero Ice Chest (R-Value); downloaded from www.moellermarine.com Jul. 2014; p. 1.

* cited by examiner

Fig. 15

COOLER WITH VACUUM PUMP

CROSS-REFERENCE TO RELATED APPLICATIONS

This application claims the benefit under 35 USC 119(e) of U.S. provisional application Ser. No. 61/965,586 filed Feb. 4, 2014.

TECHNICAL FIELD

This document relates to coolers with vacuum pumps.

BACKGROUND

Vacuum pumps are used with food storage containers such as marinating trays.

SUMMARY

A cooler comprising: an insulated housing comprising an encircling wall, base and lid, the insulated housing defining a storage cavity and having an air channel communicating from the storage cavity to outside the insulated housing, the air channel being defined by channel walls and forming at least in part a cylinder; and a vacuum pump integral with the insulated housing, the vacuum pump comprising a piston arranged to reciprocate within the cylinder under manual control from outside of the insulated housing.

A method comprising: placing material within a storage cavity of an insulated cooler, the material having an average temperature different than an ambient temperature; closing a lid over the storage cavity; and operating a vacuum pump to reduce the air pressure within the storage cavity.

A combination of the cooler and ice within the storage cavity.

A cooler chest comprising: an insulated housing defining a storage cavity and an opening to the storage cavity; a lid covering the opening when in a closed position; and a vacuum pump connected to an air removal port in the storage cavity.

In various embodiments, there may be included any one or more of the following features: A first check valve in the piston and a second check valve in the air channel between the storage cavity and the piston. The vacuum pump comprises a drive handle connected to operate the piston. The drive handle is positioned within a slot or opening in the lid. A top surface of the drive handle is flush with an adjacent top surface of the lid when the piston is in a retracted position. A finger grip contoured in one or more of the drive handle and a portion of the lid adjacent the handle. One or more ground engaging wheels mounted to the housing. A vacuum release valve connected to the storage cavity. The vacuum release valve is positioned at least partially within the lid. The vacuum release valve comprises a pull handle. A pressure monitor connected to the storage cavity and having a pressure gauge visible from an exterior of the cooler. A plurality of side handles connected to, defined by, or connected to and defined by, the housing. The material comprises food and ice.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Food preservation involves preventing the growth of bacteria, fungi (such as yeasts), or any other micro-organisms (although some methods work by introducing benign bacteria or fungi to the food), as well as retarding the oxidation of fats that cause rancidity. Food preservation can also include processes that inhibit visual deterioration, such as the enzymatic browning reaction in apples after they are cut, which can occur during food preparation.

Vacuum packing or vacuum packaging is a method of packaging that removes air from the package prior to sealing. It may involve (manually or automatically) placing a perishable food in a plastic film package, removing air from inside, and sealing the package. Shrink film may be used to have a tight fit to the contents. The intent of vacuum packing is usually to remove oxygen from the container to extend the shelf life of foods and, with flexible package forms, to reduce the volume of the contents and package. Vacuum-packing is commonly used for storing nuts to reduce loss of flavour from oxidation.

Vacuum packing reduces atmospheric oxygen, limiting the growth of aerobic bacteria or fungi, and preventing the evaporation of volatile components. It is also used to store dry foods over a long period of time, such as cereals, nuts, cured meats, cheese, smoked fish, coffee, and potato chips. On a more short term basis, vacuum packing can also be used to store fresh foods, such as vegetables, meats, and liquids, because it inhibits bacterial growth.

Vacuum-packing may be used in combination with refrigeration or freezer storage. Food may be stored in the freezer in a vacuum environment, usually in an air-tight bag or bottle. The vacuum environment strips bacteria of oxygen needed for survival, slowing spoiling and preventing or reducing freezer burn.

Figure 1:
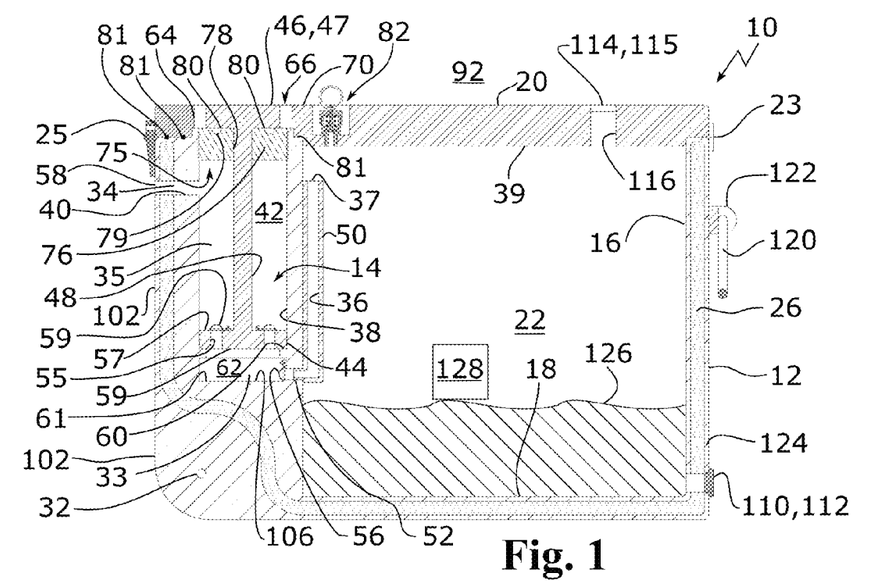
FIG. 1 is side elevation view of a cooler with a built-in vacuum pump.

Referring to FIG. 1, a cooler 10 is shown with an insulated housing 12 and a vacuum pump 14. Housing 12 may form a chest and has an encircling wall 16, a base 18, and a lid 20, the insulated housing 12 defining a storage cavity 22.

Figure 3:
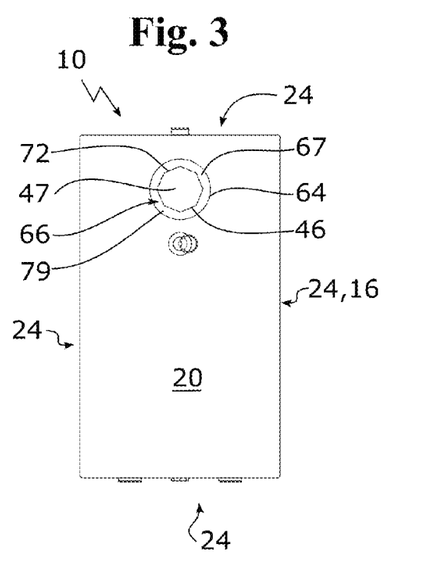
FIG. 3 is a top plan view of the cooler of FIG. 1.
Figure 4:
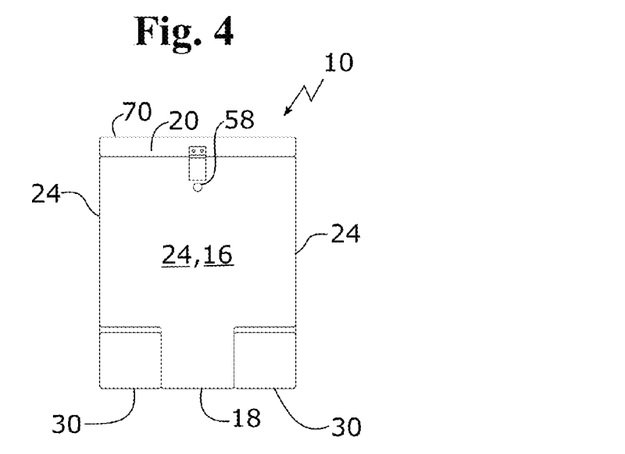
FIG. 4 is a front elevation view of the cooler of FIG. 1.
Figure 5:
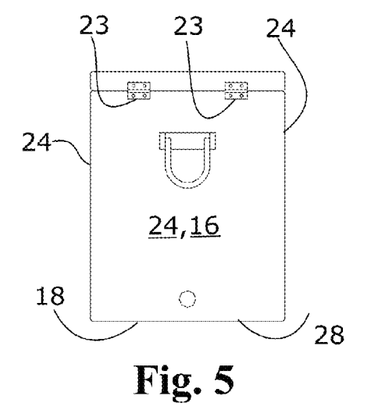
FIG. 5 is a rear elevation view of the cooler of FIG. 1.
Figure 6:
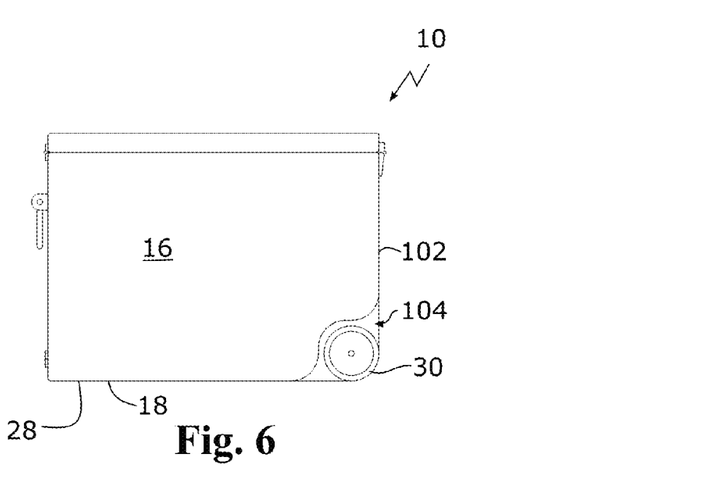
FIG. 6 is a side elevation view of the cooler of FIG. 1.

Referring to FIGS. 3-5 the encircling wall 16 may have one or more side walls 24 as shown. The wall 16 takes on a rectangular shape in the examples shown, but other suitable shapes may be used, including curved or polygonal shapes.

Referring to FIG. 1, the housing 12 has an air channel 34 communicating from the storage cavity 22 to outside the insulated housing 12. The vacuum pump 14 may be integral with the insulated housing 12. The vacuum pump 14 may comprise a piston 44 arranged to reciprocate within the cylinder 42. The piston 44 may reciprocate under manual control from outside of the insulated housing 12. An example of manual control includes the connection of piston 44 to a drive handle 46, through an intermediate shaft 48. Piston 44 acts as a displacement member that flushes and fills cylinder 42 to evacuate storage cavity 22 as will be described further.

The air channel 34 is defined by channel walls 36, 38, and 40, and may form at least in part a cylinder 42 defined within or by housing 12. Air channel 34 begins with an air removal port 37, which in the example shown is defined as the entrance into an inlet pipe 50, whose interior forms walls 36. Air removal port 37 may be positioned above base 18, for example at or near a top of the storage cavity 22 as defined by lid 20 when base 18 is positioned on a ground surface (not shown). By positioning port 37 above base 18 the chance is reduced of drawing liquids from cavity 22 through pump 14. Pipe 50 connects to a cylinder inlet 52. A first check valve or valves 54 may be positioned in the piston 44, for example connected to channels 55 from an upper surface 57 to an under surface 59 of piston 44. A second check valve or valves 56 may be positioned in the air channel 34 between the storage cavity 22 and the piston 44. Valve 56 may be within inlet 52 as shown. An air exhaust port 58 may define walls 40 and is connected to cylinder 42, with piston 44 positioned between the exhaust port 58 and the second valve 56 throughout an entire stroke cycle. Check valves 54, 56 may take a suitable form, such as a hinged dome that swings open on a pressure differential in one direction as shown. Piston 44 is shown resting on an annular shoulder 60 that limits down stroke travel and creates a base chamber 62 below piston 44 that is always present within cylinder 42. In other cases base chamber 62 and shoulder 60 may be eliminated so that piston 44 travels to the base 61 of the cylinder 42. Shoulder 60 prevents piston 44 from interfering with check valve 56 in the example shown. The coupling of valves 54, 56, and piston 44 form a positive displacement pump. Valves 54, 56 may be biased to close.

As shown a drive handle 46 may be connected to operate the piston 44. Referring to FIGS. 1 and 3, the drive handle 46 may be positioned within a slot or opening, in this case a circular opening 64, in the lid 20. A slot (not shown) may extend from top surface 47 to a side edge 69 of lid 20. A top surface 47 of the drive handle 46 may be flush with an adjacent top surface 70 of the lid 20 when the piston is in the retracted position shown. Thus, in the retracted position drive handle 46 is inset within lid 20, so as not to protrude beyond top surface 70 of lid 20 to avoid catching on items stacked on or moved across the top of lid 20.

A finger grip 66 may be contoured in one or more of the drive handle 46 and a portion 67 of the lid 20 adjacent the handle 46. In the example shown the finger grip 66 is formed by providing a polygonal shape to peripheral edges 72 of drive handle 46 and a circular shape to edges 74 of opening 64, as well as by providing a maximum diameter of top surface 47 of drive handle 46 smaller than a minimum diameter of opening 64. Other contours may be used, and polygonal, curved, elliptical, circular, non-symmetrical or indented shapes may be used for the finger grip.

Referring to FIG. 1, at an upper portion 75 of cylinder 42 a ring 76 may be mounted, for example by threading into cylinder 42 as shown. Shaft 48 may extend through central aperture 78 in ring 76. Slots 80 for gaskets, such as o-rings (not shown) may be provided in an upper surface 79 of ring 76 for sealing against drive handle 46.

To create a vacuum within storage cavity 22, a user follows several stages. First the lid 20 is closed, for example by placement over storage cavity 22 or by rotating into the closed position shown using a hinge 23. A latch or lock 25 such as a clip or other securing mechanism may be used to secure the lid 21 in place. The user manually grabs handle 46 and begins to reciprocate piston 44 within cylinder 42. Upward piston movement from the position shown in FIG. 1 begins by a pull on the handle 46. On each upstroke where the piston 44 is being extended upwards through the cylinder 42 from the position shown in FIG. 1, air is drawn through port 37, valve 56 and into the portion 33 of cylinder 42 defined between the base 61 and bottom surface 59 of piston 44. In addition, during extension air within the portion 35 of cylinder 42 defined between upper portion 75 and top surface 57 of piston 44 is displaced out of port 58 while valves 54 remain closed.

Once piston 44 reaches the top of a stroke cycle, the user pushes handle 46 downwards and piston 44 travels back to the retracted position shown in FIG. 1. During retraction valves 54 open and valve 56 closes to transfer air from the portion 33 to the portion 35 of cylinder 42. With each cycle the process is repeated until all or substantially all air is expelled from storage cavity 22. Lid 20 may be sealed, for example using gaskets 81, to housing 12 to prevent undesired air ingress into cavity 22. Gaskets 81 may surround a peripheral edge (not shown) of housing 12. The gasket 81 may be a rubber seal, or may be made of another suitable material.

Figure 2:
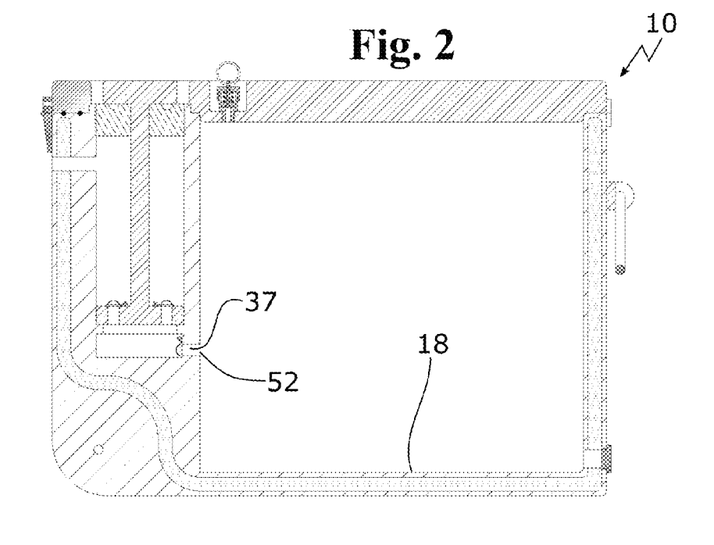
FIG. 2 is a side elevation view of another embodiment of the cooler of FIG. 1 with the only difference from FIG. 1 being the removal of the inlet tube between the vacuum pump and storage cavity.

Referring to FIG. 1 the inlet pipe 50 extends the air removal port 37 to at or near the top 39 of cavity 22. Referring to FIG. 2, in another embodiment pipe 50 is omitted. However, air removal port 37 is still provided above base 18 to avoid withdrawing liquids. In other cases air removal port 37 is positioned at or near base 18 to work as a vacuum air pump and a liquid drain.

Figure 13:
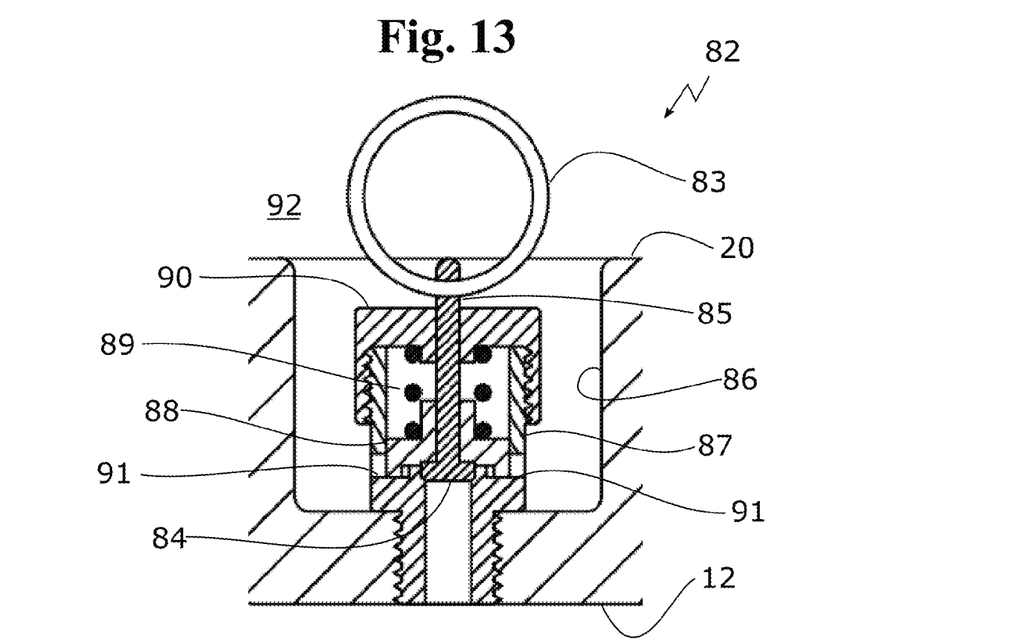
FIG. 13 is a section view of the vacuum release valve from the cooler of FIG. 1.

Referring to FIG. 1, a vacuum release valve 82 may be connected to the storage cavity 22. Referring to FIG. 13, a close up cross-sectional view of the valve 82 is shown. The vacuum release valve 82 may be positioned at least partially within the lid 20. The example shown includes a pull handle, for example ring 83 pivotally connected to a piston 84 via a shaft 85. Vacuum release valve 82 may be positioned on a second air channel 86 communicating from the storage cavity 22 to outside the insulated housing 12. Part of valve 82 may include a cylinder 87 threaded into the lid 20 as shown. When ring 83 is pulled to release the vacuum, piston 84 is drawn upwards, pulling a ring 88, which is seated upon piston 84 and within cylinder 87, against a biasing force provided by a spring 89 compressed between ring 88 and a cap 90. Once ring 88 clears side ports 91 in cylinder 87, air is free to travel from an exterior 92 through side ports 91 and air channel 86 into storage cavity 22. Valve 82 may be inset within lid 20 as shown, so that valve 82 does not project above the lid 20 when not being used. When the ring 83 is released the spring 89 or other biasing member pushes piston 84 and ring 88 downwards to seal off cavity 22 from ports 91.

Figure 7:
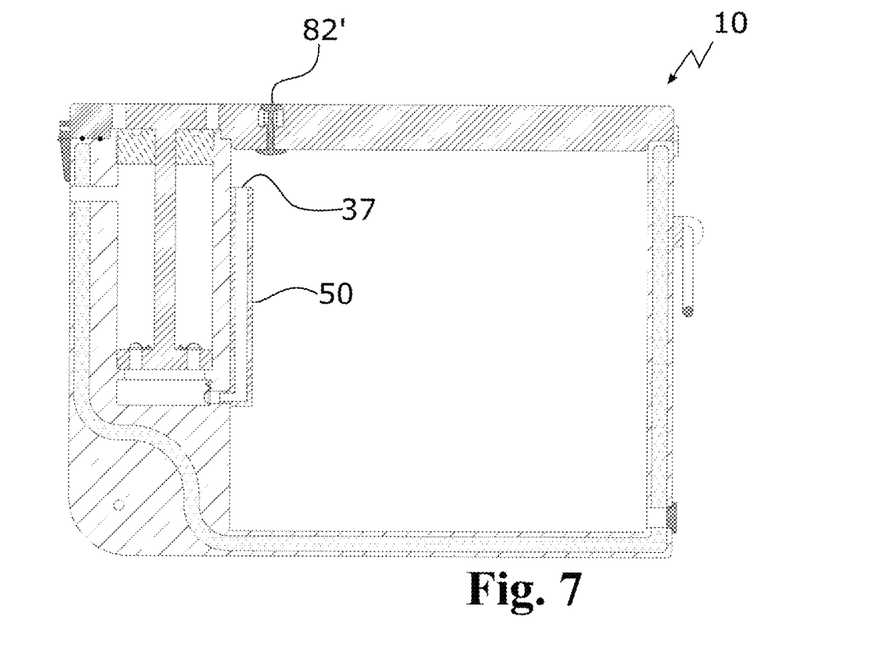
FIG. 7 is side elevation view of another embodiment of the cooler of FIG. 1 with a push vacuum release valve.
Figure 8:
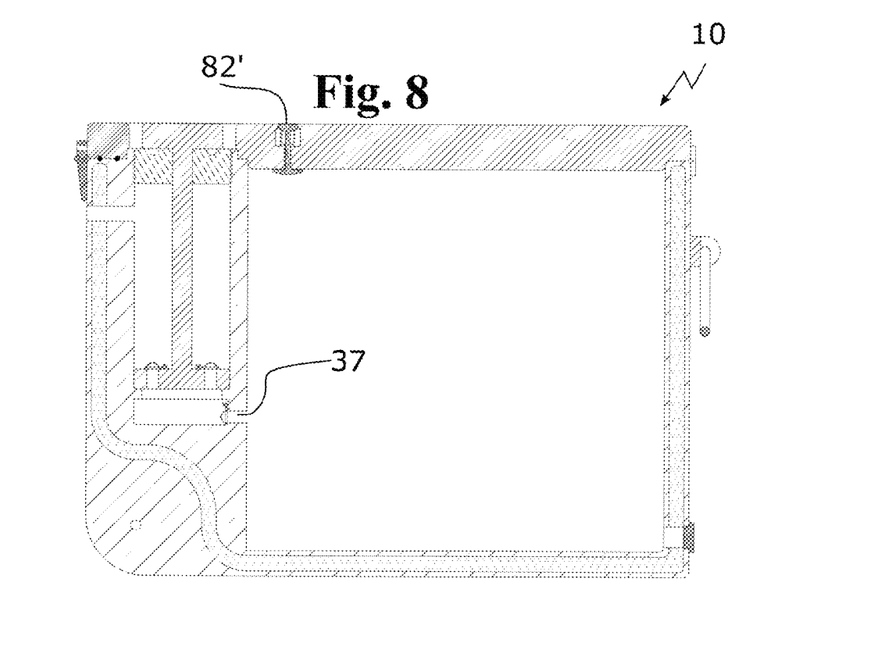
FIG. 8 is a side elevation view of another embodiment of the cooler of FIG. 7 with the inlet tube between the vacuum pump and storage cavity removed.
Figure 09:
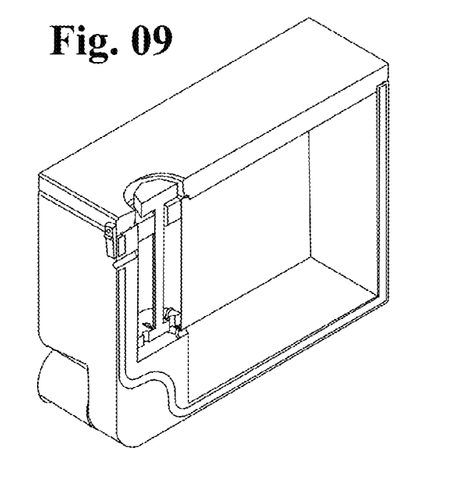
FIGS. 9-12 are perspective cut-away views of another embodiment of the cooler of FIG. 1.
Figure 10:
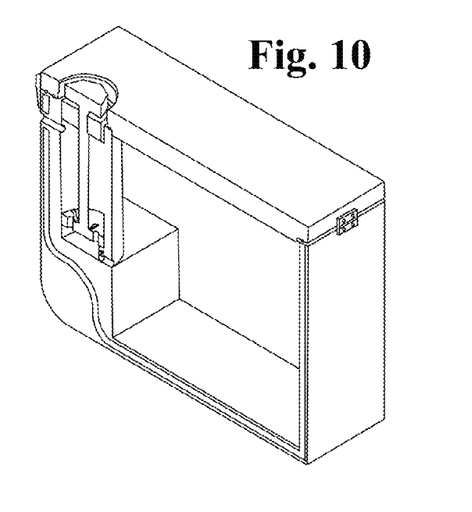
Figure 11:
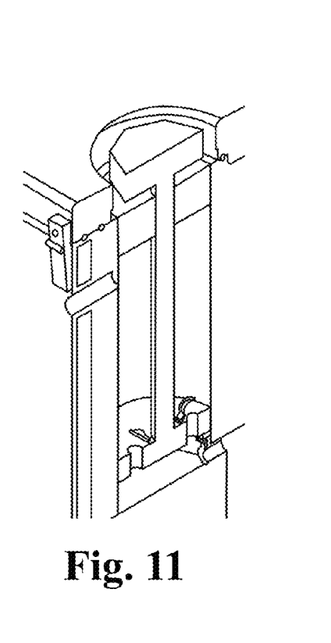
Figure 14:
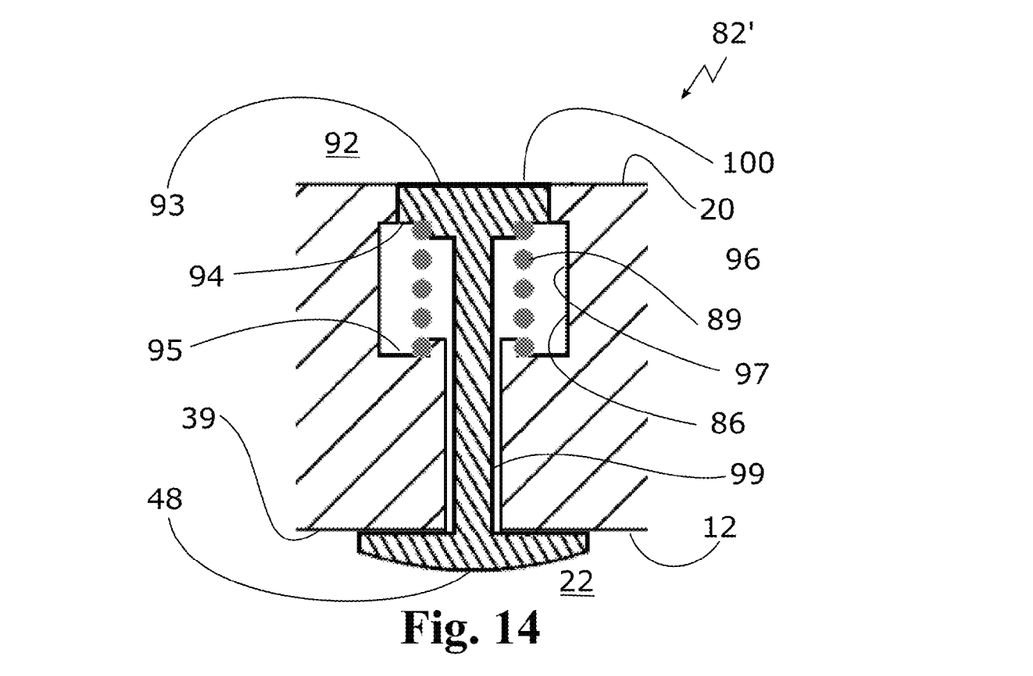
FIG. 14 is a section view of the vacuum release valve from the cooler of FIG. 7.

Referring to FIGS. 7 and 8, further embodiments are shown that differ from FIGS. 1 and 2, respectively, by substitution of vacuum release valve 82 with a valve 82', and by removal of the drain 110. Valve 82' is a push valve. Referring to FIG. 14, like valve 82, valve 82' is positioned within a second air channel 86, which may be in lid 20 as shown, communicating from the storage cavity 22 to outside the insulated housing 12. Valve 82' also incorporates a piston 93 within channel 86. To release the vacuum a user pushes downwards on piston 93 against biasing force of a spring 89 compressed between an under surface 94 of piston 93 and a seat 95 within channel 86. Once piston 93 clears a lower ledge 96 of a cylinder 100 and enters into a cylinder 97 with a larger diameter than cylinder 100, and a lower flange 98 connected to piston 93 via a shaft 99 is unseated from sealing contact to a top 39 of lid cavity 22, air is permitted to travel from exterior 92 to storage cavity 22 to release the vacuum. Once piston 93 is released, spring 89 retracts piston 93 back into cylinder 100 to seal off cavity 22 from exterior 92. Valve 82' may also be inset within the lid 20. Other suitable vacuum release valves may be used. The valve 82' should remain closed when in a neutral state where the interior cavity 22 is evacuated and the valve 82' is not under an external force intended to open the valve 82'. To achieve such an effect the spring 89 may be under compression in the neutral state shown. In such a case a stop may be provided above piston 93, or the piston 93 may simply be allowed to travel upwards a distance within cylinder 100 without opening the valve. Thus, to open the valve the combined force by a) the user and b) the pressure differential between the exterior 92 and the interior cavity 22 must be sufficient to overcome c) the compressive force of the spring and d) the internal friction of the valve. Other design features may be used to prevent premature opening, including providing valve 82' with sufficient internal friction such that a threshold force required to open the valve 82' is above the force of the pressure differential between exterior 92 and interior cavity 22. Such friction may be provided by close fitting relationships between components, such as between cylinder 100 and piston 93. Expandable seals may also be used, for example between flange 98 and top 39.

Referring to FIG. 1, the housing 12 may be insulated by providing one or more internal layers 26 of thermal insulation in wall 16 and in some cases lid 20 as well. Pump 14 may be within an outer layer 26 of insulation. Insulation may include material that when positioned within housing 12 provides an R-value of two or higher, for example five or higher across the material from the exterior to the interior of the storage cavity 22. In some cases the insulated housing 12 may have an overall R-value of two or higher. The overall R-value may be calculated by averaging all R-values of all cross-sectional paths into the cavity 22 when the lid 20 is on and the cavity 22 is sealed. R-value is a measure of thermal resistance and is used in the building and construction industry. Styrofoam at a half an inch provides an R-2 rating. Other insulative materials may be used including closed and open cell foam, wood, plastics, and spray foam. The thermal conductivity and thickness of the material influence the resulting R-value. Polyisocyanurate is one insulation option. Other suitable methods of insulating housing 12 may be provided, including insulative coatings, loose fillers, panels, single or plural internal insulative layers, vacuum, gas, or air cavities within wall 16. Different insulating methods may be used for different parts, for example internal layer 26 may be used to insulate wall 16 and base 18, while the entire lid 20 may be constructed of insulative material. The walls of housing 12 may be double walled as shown.

The type of cooler 10 shown is a form of insulated chest, also known as an ice chest. Other names include a portable ice chest, ice box, cool box, chilly bin (in New Zealand), and 'esky' (Australia). Ice cubes are most commonly placed in coolers to help the internal contents, such as food, stay cool. Ice packs may be used, as they either contain the melting water inside, or have a gel sealed inside that stays cold longer than plain ice (absorbing heat as it changes phase). Size may be based on the volume capacity of storage cavity 22, which may range from eight liters for a single-person unit to fifty liters for a family unit to one hundred forty liters for a fishing or hunting cooler. Larger or smaller sizes are possible.

Referring to FIGS. 1 and 3-6 the wall 16 and base 18 of housing 12 collectively define a box or bin shape. One or more ground engaging members, such as a foot pad 28 and wheels 30 may be mounted to the housing 12. Wheels 30 may include a pair of rollers connected by an axle 32, for example to a front portion 102 of housing 12. Wheels 30 permit cooler 10 to be maneuvered into position via rolling instead of relatively more labor intensive actions such as dragging or lifting.

Figure 12:
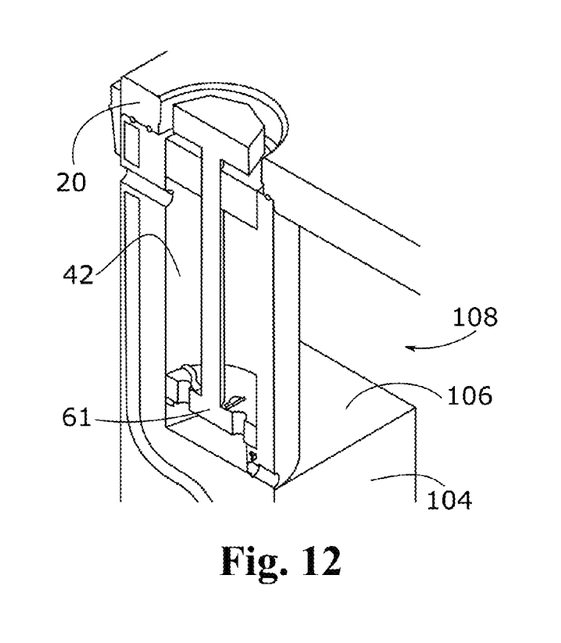
Figure 15:
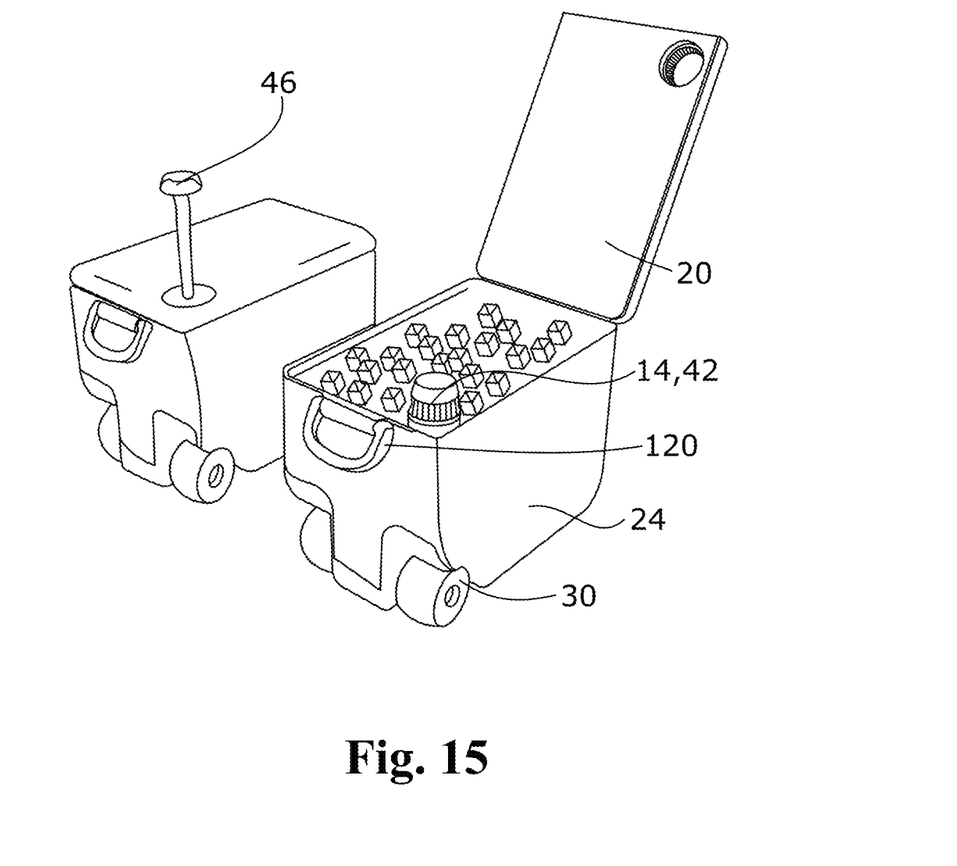
FIG. 15 is a perspective view of open and closed examples of another embodiment of the cooler of FIG. 1 with the vacuum pump in a corner of the housing 12.

Referring to FIGS. 1, 4, 6, and 12, wheels 30 may be inset within wheel wells 104 in housing 12, such wells 104 defining an inner ledge 106 within storage cavity 22. Ledge 106 is shown in FIG. 12 as extending across both wheel wells 104 to form base 61 of cylinder 42. Cylinder 42 projects upwards from ledge 106 to lid 20 in the example shown. Gaps 108 may be formed between cylinder 42 and side walls 24, the gaps 108 of which may be used for additional storage within cavity 22 on either side of the cylinder 42. In another embodiment cylinder 42 is located above one of the wheel wells 104, for example in the corner of the housing as shown in FIG. 15. The cylinder 42 may be located adjacent or as part of one or more side walls 24, of housing 12 to avoid interference with cavity 22.

Referring to FIG. 1, a drain 110 may be provided at or near base 18 to allow manual draining of liquids within cavity 22. For example, liquids may build up as ice within cavity 22 melts over time. Liquids may also include beverages stored within cavity 22. A drain cap 112, which may be threaded as shown, may be provided for removal to open the drain. Other drain mechanisms may be used.

A pressure monitor 114 may be connected to the storage cavity 22 for example by positioning within a channel 116 in lid 20 or another suitable location of housing 12. Monitor 114 may have a pressure gauge 115 visible from an exterior 92 of the cooler 10. The gauge 115 lets the user know visually what level, if any, of vacuum remains in the cooler 10. The user may then make a decision to increase the vacuum or not. In other cases the user may use the gauge 115 to ensure that the vacuum is released prior to opening the lid 20. The user may also use gauge 115 to check if the cooler 10 has a leak or not, or to see if the drain cap is or is not securely fastened.

Referring to FIG. 1, cooler 10 may have a plurality of side handles 120 connected to, defined by, or connected to and defined by, the housing 12. For example a handle 120 may be hingedly secured to a base 122 mounted to a rear side wall 124 of the housing 12. The handle 120 may be connected to the side wall 124 that is opposite the side wall 102 nearest to the wheels 30. Side handles (not shown) may also be present on other of side walls 24, for example by providing indents in walls 24 for a user to grasp with hands. The cooler 10 may have one or more extendable and retractable handles (not shown), such as a telescoping handle used on a luggage suitcase.

Material 128 such as ice 126 may be present in storage cavity 22. Ice 126 may be replaced by other thermal energy sinks or sources, for example an ice pack or hot pack, respectively. The material 128 may include food, for example solid food or beverages or both. Cavity 22 may thus represent a food cavity 22. Nonfood material 128 may be present in cavity 22. The material 128 may be placed within cavity 22. Material 128 may have an average temperature different, for example lower, than an ambient temperature. The material 128 may initially be at room temperature but after being placed with other material 128, such as ice 126 that absorbs thermal energy from material 128, material 128 may end up with a temperature below ambient temperature. Ambient temperature is understood as being the average temperature of air 92 exterior to housing 12. The lid 20 may be closed, and pump 14 operated to reduce, for example evacuate, the air pressure within the storage cavity 22. In another embodiment, a pressure source (not shown) may be provided to replace the evacuated air volume in cavity 22 with an inert gas, such as nitrogen.

Other pistons 14 include a diaphragm or a travelling disc, also known as a floating piston. Other displacement members may be used. A threaded cap drain 112 is shown, but other suitable drains may be used such as a button activated valve, a half-turn valve, and a friction-fit stopper. Establishing a vacuum in cavity 22 reduces the conduction of thermal energy between the material 126 such as food 128 in cavity 22 and the exterior 92. The pump 14 may be secured to the outside of the housing 12, or formed or secured within a receptacle or slot in the housing 12. The pump 14 may be removable, for example for replacement. In some cases the pump 14 may be powered by other than manual power, for example if a battery or outlet-plug-in cord is provided along with an electric motor for operating the pump 14. In some cases the vacuum release is coupled to the vacuum pump 14, for example so that a quarter or half turn of the pump handle 46 releases the vacuum by aligning exhaust air channels. Use of relative directional language like top, bottom, base upper, lower, up, down, upwards, downwards, and others are relative and are not restricted to absolute directions or orientations defined with respect to the surface of the earth. The cylinder 42 may be oriented so that piston 44 reciprocates along a non-vertical axis, for example if cylinder 42 is mounted on its side within housing 12.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A cooler comprising:
    an insulated housing comprising an encircling wall, base and lid, the insulated housing defining a storage cavity and having an air channel passing through at least one of the encircling wall and the base, communicating from the storage cavity to outside the insulated housing, the air channel being defined by channel walls between the storage cavity and the outside of the insulated housing and forming at least in part a cylinder;
    a vacuum pump integral with the insulated housing such that the encircling wall of the insulated housing forms at least a portion of the cylinder, the vacuum pump comprising a piston arranged to reciprocate within the cylinder under manual control from outside of the insulated housing and a drive handle connected to operate the piston, wherein the drive handle has a flat top surface, the drive handle is positioned with a slot or opening in the lid, and the top surface of the drive handle is flush with an adjacent top surface of the lid when the piston is in a retracted position; and
    the insulated housing comprising at least one internal layer of thermal insulation, and the vacuum pump being located within the internal layer of thermal insulation, the internal layer of thermal insulation extending from the base internally within the insulated housing and under the vacuum pump to form a structural feature that can support a wheel.

2. The cooler of claim 1 further comprising a first check valve in the piston and a second check valve in the air channel between the storage cavity and the piston.

3. The cooler of claim 2 further comprising a finger grip contoured in one or more of the drive handle and a portion of the lid adjacent the handle.

4. The cooler of claim 1 further comprising one or more ground engaging wheels mounted to the housing.

5. The cooler of claim 1 further comprising a vacuum release valve connected to the storage cavity.

6. The cooler of claim 5 in which the vacuum release valve is positioned at least partially within the lid.

7. The cooler of claim 6 in which the vacuum release valve comprises a pull handle.

8. The cooler of claim 1 further comprising a pressure monitor connected to the storage cavity and having a pressure gauge visible from an exterior of the cooler.

9. The cooler of claim 1 further comprising a plurality of side handles connected to, defined by, or connected to and defined by, the housing.

10. A method comprising:
    placing material within a storage cavity of an insulated cooler, the cooler comprising:
    an insulated housing comprising an encircling wall, base and lid, the insulated housing defining a storage cavity and having an air channel passing through at least one of the encircling wall and the base, communicating from the storage cavity to outside the insulated housing, the air channel being defined by channel walls between the storage cavity and the outside of the insulated housing and forming at least in part a cylinder;
    a vacuum pump integral with the insulated housing, such that the encircling wall of the insulated housing forms at least a portion of the cylinder, the vacuum pump comprising a piston arranged to reciprocate within the cylinder under manual control from outside of the insulated housing and a drive handle connected to operate the piston, wherein the drive handle has a flat top surface, the drive handle is positioned with a slot or opening in the lid, and the top surface of the drive handle is flush with an adjacent top surface of the lid when the piston is in a retracted position;
    the insulated housing further comprising at least one internal layer of thermal insulation and the vacuum pump being located within the internal layer of thermal insulation, the internal layer of thermal insulation extending from the base internally within the insulated housing and under the vacuum pump to form a structural feature that can support a wheel; and
    the material having an average temperature different than an ambient temperature;

closing the lid over the storage cavity; and
operating the vacuum pump to reduce the air pressure within the storage cavity.

11. The method of claim 10 in which the material comprises food and ice.

12. A cooler comprising:
an insulated housing defining a storage cavity and an opening to the storage cavity;
a lid covering the opening when in a closed position;
a vacuum pump connected by an air channel defined by channel walls to an air removal port in the storage cavity, the air removal port being located in a non-lid portion of the storage cavity, the vacuum pump comprising a piston arranged to reciprocate within a cylinder formed at least in part by the insulated housing and a drive handle connected to operate the piston, wherein the drive handle has a flat top surface, the drive handle is positioned with a slot or opening in the lid, and the top surface of the drive handle is flush with an adjacent top surface of the lid when the piston is in a retracted position; and
the insulated housing further comprising at least one internal layer of thermal insulation and the vacuum pump being located within the internal layer of thermal insulation, the internal layer of thermal insulation extending from the base internally within the insulated housing and under the vacuum pump to form a structural feature that can support a wheel.

* * * * *